(12) United States Patent  
Kim (10) Patent No.: US 7,228,637 B2
(45) Date of Patent: *Jun. 12, 2007

(54) IMPACT-ABSORBING END CAPS FOR LEVELS

(75) Inventor: Charles Kim, Raleigh, NC (US)

(73) Assignee: Empire Level Mfg. Corp., Mukwonago, WI (US)

( * ) Notice: Subject to any disclaimer, the term of this patent is extended or adjusted under 35 U.S.C. 154(b) by 14 days.

This patent is subject to a terminal disclaimer.

(21) Appl. No.: 11/108,295

(22) Filed: Apr. 18, 2005

(65) Prior Publication Data

US 2005/0229417 A1 Oct. 20, 2005

Related U.S. Application Data

(63) Continuation-in-part of application No. 10/826,525, filed on Apr. 16, 2004, now Pat. No. 7,073,270.

(51) Int. Cl.
*G01C 9/10* (2006.01)
*G01C 9/24* (2006.01)

(52) U.S. Cl. .......................................... 33/451; 33/365

(58) Field of Classification Search .................. 33/451, 33/379, 377, 365, 755, 761, 771
See application file for complete search history.

(56) References Cited

U.S. PATENT DOCUMENTS

| | | | | |
|---|---|---|---|---|
| 3,286,275 | A | * | 11/1966 | Marchello ...................... 2/411 |
| 3,300,250 | A | | 1/1967 | Dollgener et al. ....... 248/118.1 |
| 3,574,379 | A | | 4/1971 | Jordan ......................... 293/109 |
| 4,346,205 | A | | 8/1982 | Hiles ............................ 528/53 |
| 4,710,984 | A | * | 12/1987 | Asper et al. .................... 2/412 |
| 4,991,303 | A | | 2/1991 | Marth et al. .................. 33/379 |
| 5,083,778 | A | * | 1/1992 | Douglass ..................... 473/329 |
| 5,143,359 | A | | 9/1992 | Bush ............................. 269/6 |
| 5,165,650 | A | | 11/1992 | Letizia ....................... 248/467 |
| 5,274,846 | A | | 1/1994 | Kolsky ............................ 2/2 |
| 5,363,631 | A | | 11/1994 | Garrison ....................... 54/66 |
| 5,412,876 | A | * | 5/1995 | Scheyer ...................... 33/379 |
| 5,479,717 | A | | 1/1996 | von Wedemeyer .......... 33/379 |
| 5,709,034 | A | * | 1/1998 | Kohner ........................ 33/377 |
| 5,940,978 | A | | 8/1999 | Wright et al. ................ 33/381 |
| 5,980,143 | A | | 11/1999 | Bayer et al. ................ 400/715 |
| 6,381,859 | B1 | * | 5/2002 | Wedemeyer ................. 33/365 |
| 6,675,490 | B1 | * | 1/2004 | Krehel et al. ................ 33/382 |
| 6,792,686 | B2 | | 9/2004 | Krehel et al. ................ 33/382 |

(Continued)

*Primary Examiner*—Diego Gutierrez
*Assistant Examiner*—Amy R. Cohen
(74) *Attorney, Agent, or Firm*—Jansson Shupe & Munger Ltd.

(57) ABSTRACT

An impact-absorbing end cap for an instrument such as a level is provided that is secured to an end of the level and has an outer portion and an intermediate portion. The intermediate portion is positioned between the outer portion and the body of the level and is securely fastened to the outer portion. In addition, the intermediate portion provides greater resilient compressibility than the outer portion so that the end cap is better adapted to absorb impacts to the outer portion and thereby prevent damage to the level. Preferably, the outer portion has a profile matching the body profile at the end of the level and the intermediate portion forms a serrated intermediate profile to facilitate compression of the end cap. Also preferred is where the end cap includes an inner portion with less resilient compressibility than the intermediate portion.

28 Claims, 6 Drawing Sheets

U.S. PATENT DOCUMENTS

| | | |
|---|---|---|
| 7,073,270 B2 * | 7/2006 | Kim .......................... 33/451 |
| 2002/0022532 A1 * | 2/2002 | Tucker, Sr. ................. 473/288 |
| 2002/0183134 A1 * | 12/2002 | Allen et al. ................. 473/329 |
| 2003/0145541 A1 | 8/2003 | Brightwell et al. ......... 52/309.3 |
| 2003/0163927 A1 | 9/2003 | Kallabis et al. ............... 33/365 |
| 2005/0155241 A1 * | 7/2005 | Scheyer ....................... 33/379 |
| 2005/0229416 A1 * | 10/2005 | Kim .......................... 33/451 |

* cited by examiner

IMPACT-ABSORBING END CAPS FOR LEVELS

RELATED APPLICATION

This application is a continuation-in-part of U.S. patent application Ser. No. 10/826,525, filed on Apr. 16, 2004 now U.S. Pat. No. 7,073,270.

FIELD OF THE INVENTION

This invention relates to geometric instruments and, more particularly, to levels (sometimes referred to as "spirit levels") used by carpenters and the like.

BACKGROUND OF THE INVENTION

Levels are used by carpenters, masons, drywallers and the like for helping to assure that surfaces are horizontal, vertical, or at a specified angular relationship to the horizon. A typical level includes at least two vials, one each for ascertaining whether a surface is "level," i.e., horizontal, or "plumb," i.e., vertical.

A level comprises a measuring surface or surfaces and a vial set at an angular relationship to such surface(s). The vial is partially filled with a liquid such as mineral spirits. The vial is not completely filled and a bubble is thereby formed when the vial is closed. Typically, two marker rings are applied to the outside of the vial in positions to visually divide the cavity into three portions of about equal length. Level and plumb conditions are ascertained by noting the position of the bubble with respect to the marker rings.

A problem with such levels is that the vials and, to a lesser extent, the level's body can be damage easily during use. Levels are often left in position on a surface to be measured or set and can be knocked off causing them to fall to the ground. In addition, many levels have a greater length, frequently about four feet, and may be bumped or knocked by those who are more accustomed to dealing with tools of smaller dimensions. In addition, the great length of some levels causes an increase in weight which can add to stresses involved with falling or being bumped.

Therefore, there is a need to provide a device serving as an end cap having greater impact-absorbing properties for reducing stress on level bodies and vials. This device would be a novel and non-obvious improvement over many end caps in the prior art. An improved level which includes such impact-absorbing end caps so that the level withstands falls and bumps typically causing damage to certain existing levels would solve these noted problems of the prior art.

OBJECTS OF THE INVENTION

It is an object of the invention to provide an improved end cap for use on a level that overcomes some of the problems and shortcomings of the prior art, including those mentioned above.

Another object of the invention is to provide a level that includes dual-layer end caps which provide for enhanced impact absorption.

Another object of the invention is to provide a level which allows for greater compression of its end caps when impacted.

Another object of the invention is to provide a level which includes ridged end caps to facilitate compression of its end caps when impacted.

Another object of the invention is to provide a level having ends which provide improved protection from contact with foreign objects.

Yet another object of the invention is to provide a level having increased impact-resistance with little additional weight.

Another object of the invention is to provide a level having coextensive end caps such that the profile of the end caps does not interfere during measurements.

How these and other objects are accomplished will become apparent from the following descriptions and from the drawings.

SUMMARY OF THE INVENTION

In certain preferred embodiments, the invention is an end cap for a level having a body that extends from a first end to a second end and that includes at least one vial mounted to it. The end cap is secured to the first end and has an outer portion and an intermediate portion. The intermediate portion is positioned between the outer portion and the body and is securely fastened to the outer portion. In addition, the intermediate portion provides greater resilient compressibility than the outer portion so that the end cap is better adapted to absorb impacts to the outer portion and thereby prevent damage to the level.

In more desirable embodiments, the outer portion is spaced apart from and does not abut the body. Most preferred is where the outer portion extends from a top edge to a bottom edge where the top edge rests within the same plane as a top surface of the body and the bottom edge is similarly co-planar with the bottom surface of the body.

Highly desirable is where the body defines a body profile at the first end and the outer portion defines an outer profile matching this body profile. In such embodiments, the intermediate portion forms an intermediate profile that is serrated by having certain segments with profiles congruent to the body profile and other segments with profiles smaller than this profile. In this manner, one skilled in the art will recognize that the intermediate portion facilitates compression of the end cap when impacted and the profile of the end cap forms a coextensive end cap that does not interfere with the body of the level during measurements.

A certain desired embodiment finds the end cap also having an inner portion with less resilient compressibility than the intermediate portion. These end caps have the intermediate portion securely fastened to this inner portion and spaced apart from the first end with the inner portion positioned in between, connecting the intermediate portion to the first end. More preferred is where the outer portion is separated at a distance from the inner portion and the inner portion is the only portion of the end cap abutting the first end for securing the end cap to the body.

In these embodiments, it is most desirable that both the inner and outer portions be composed of the same material. This material is preferably one having Shore A hardness of at least about 75 on the Shore A scale running from 0 to 100. More preferred is where the material has Shore A hardness of at least about 85. Highly preferred is where inner and outer portions have Shore A hardness of about 90.

In certain embodiments, it is also desirable that the intermediate portion have a Shore hardness of no more than about 70. Most desirable is where this portion has a Shore hardness of no more than about 60. Very desirable is when the intermediate portion is made from a material having a Shore hardness of about 55.

In certain preferred forms, all portions of the end cap are formed from elastomeric materials.

In another desired example of this embodiment, at least one interior portion is positioned between both the inner and outer portions to which it is securely fastened. In addition, these forms have the intermediate portion securely fastened to this interior portion and forming an intermediate layer that extends between the inner and outer portions.

Highly desirable is where the inner, interior and outer portions are parts of an unitary end-cap-member that has a groove and where the intermediate portion is a band that is embedded within this groove. In these embodiments, it is preferred that the groove circumscribe the interior portion of the end-cap-member.

In another desired form of this embodiment, the interior portion has at least one cavity. This cavity preferably extends through the inner portion to the first end of the level. Much preferred is where there are two cavities within the interior portion and both of these cavities extend through the inner portion to the first end.

One highly desirable embodiment finds the inner portion including an attachment ring that is adapted to be received within the body through the first end. There is an aperture in the attachment ring and the body has openings spaced adjacent to the first end that are in registry with this aperture such that at least one insert is inserted into the openings and aperture to firmly secure the end cap to the first end.

In another aspect of this invention, it is directed to an improved level of the type having a body extending from a first end to a second end, a level face connected with respect to the body for measuring a surface, and a vial mounted with respect to the body at a predetermined angular relationship to the level face. The improvement comprises end caps mounted to the first and second ends where each end cap has an outer layer spaced apart from the body and an intermediate layer positioned between the outer layer and the body. This intermediate layer is joined to the outer layer and has greater compressibility than the outer portion. Impact to either end cap therefore results in greater compression of the end cap and dissipation of the impact to prevent damage to the level.

Most desirable is where the body defines a body profile at each end and the outer layers define outer profiles that match the body profile. Each outer layer also has a top outer-edge co-planar with a top surface of the body and a bottom outer-edge co-planar with the bottom surface of the body. The intermediate layers have first and second segments that define serrated intermediate profiles. The first segments have first profiles that match the body profile and top and bottom intermediate-edges co-planar with the corresponding top and bottom outer-edges. The second segments define second profiles smaller than the body profile.

More preferable is where each end cap also has an inner layer that abuts the corresponding end of the level. The intermediate layer is joined to this inner layer and has greater compressibility than the inner layer. Moreover, the intermediate layer of each end cap is spaced apart from the end by the inner layer and the outer layer of each end cap is spaced apart from the inner layer by the intermediate layer. Most desirable is where the intermediate layer of each end cap includes interior and exterior portions such that the interior portion connects the inner layer to the outer layer to form an integral end-cap-member. This member is composed of a material different from the material composing the exterior portion.

Highly preferred in certain of these embodiments is where the end-cap-member defines a groove and the exterior portion is a band that is embedded within this groove. Very desirable in such forms is where the exterior portion and the end-cap-member are composed of different elastomers. Most preferred is when each interior portion has two cavities that extend through the inner layer to its corresponding end.

DETAILED DESCRIPTION OF PREFERRED EMBODIMENTS

Figure 1:
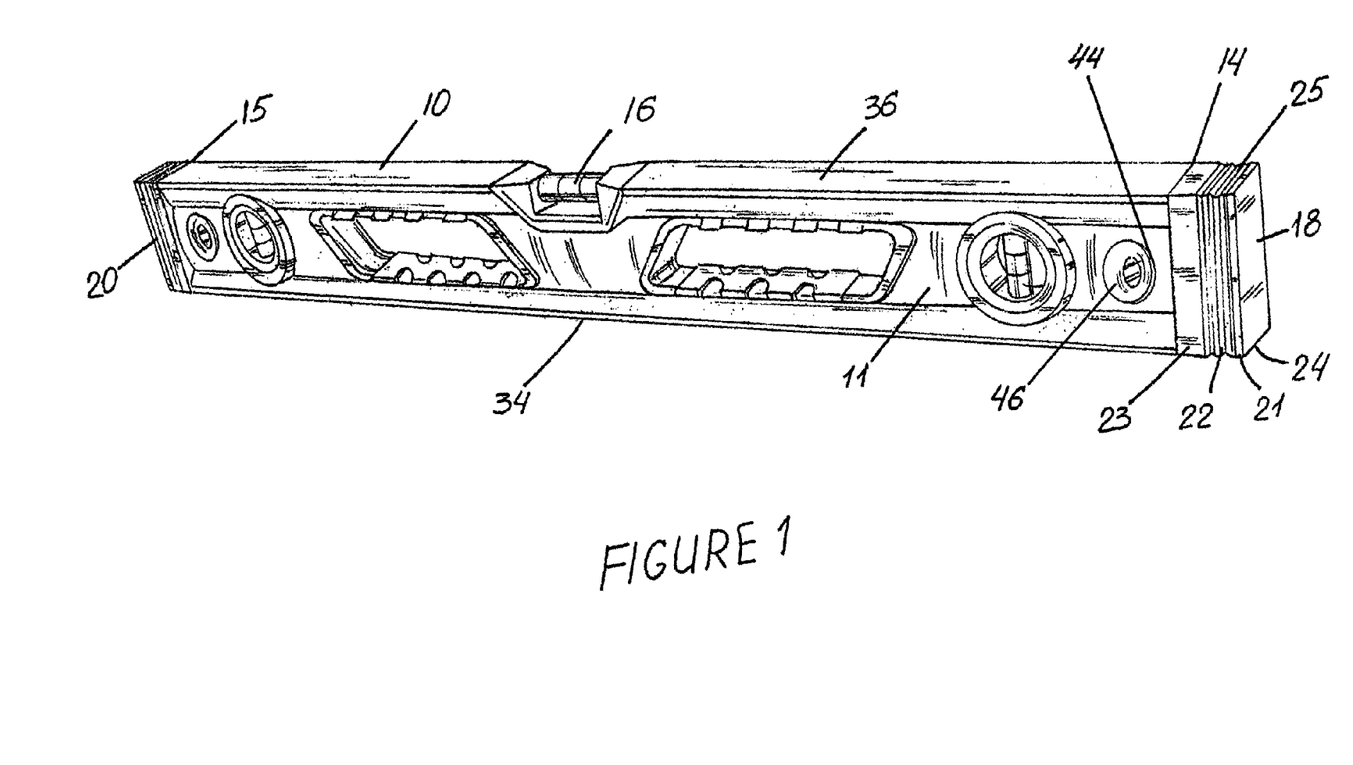
FIG. 1 is a perspective view of a level having impact-absorbing end caps in accordance with an embodiment of the invention.
Figure 2:
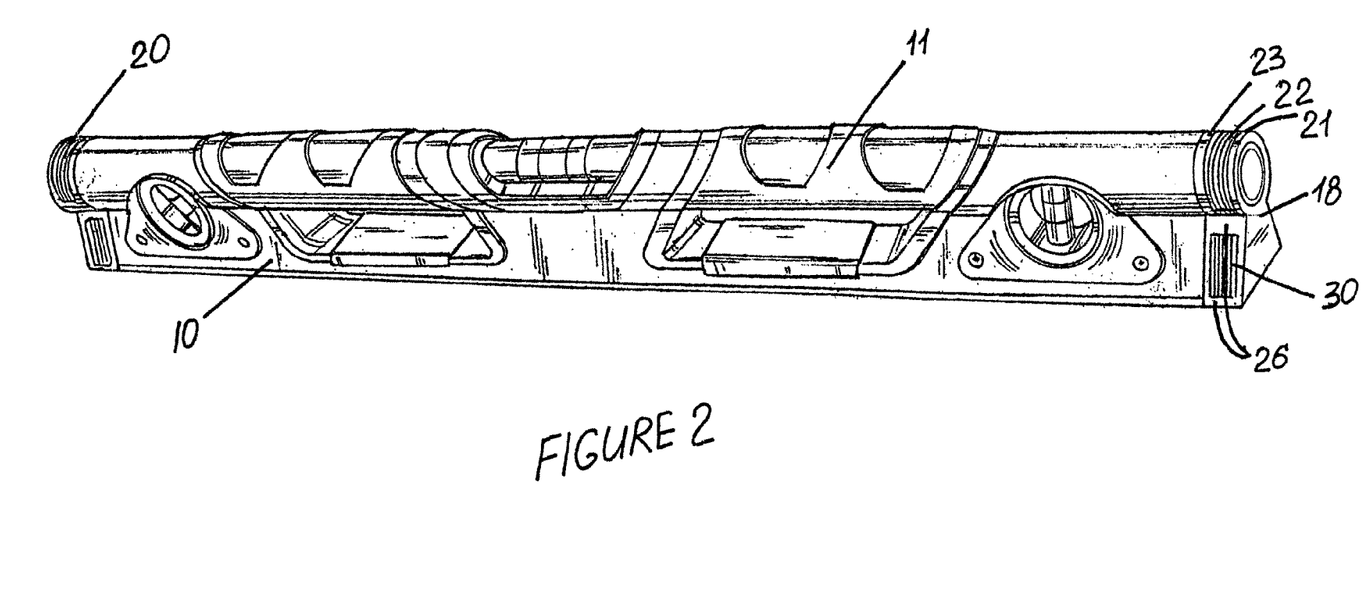
FIG. 2 is a perspective view of a level having impact-absorbing end caps in accordance with another embodiment of the invention
Figure 3:
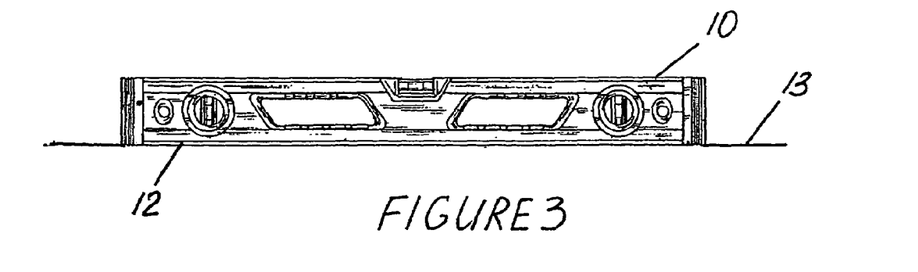
FIG. 3 is a front elevation of the level of FIG. 1 in contact with a surface to be measured.

FIGS. 1 and 2 are perspective views of alternate embodiments of an instrument such as a level 10 having impact-absorbing end caps 20. Each level 10 includes a body 11 having a level face 12 for measuring a surface 13 (see FIG. 3), the body extending from a first end 14 to a second end 15. Each level 10 further includes at least one vial 16 mounted in body 11 at a predetermined angular relationship to level face 12, such as parallel to, perpendicular to, or at another specific angle to level face 12.

End caps 20 are secured to first and second ends 14, 15. Each end cap 20 has an outer layer 21, an intermediate layer 22, and an inner layer 23. Outer layer 21 is securely connected to intermediate layer 22 which is likewise securely connected to inner layer 23. Inner layers 23 firmly secure end caps 20 to ends 14, 15. Layers 21, 22, 23 are preferably bonded together through adhesion utilizing a heat processing, through use of an adhesive, ultrasonic welding, or through the combination of any of these methods.

Intermediate layer 22 has greater resilient compressibility than outer layer 21 and inner layer 23 such that intermediate layer 22 is compressed more easily and to a greater degree during impacts. Resilience relates to the ability of a material, upon being compressed (i.e., immediately after being compressed), to recover its original shape. In the structures of this invention, resilience relates to how quickly the surface recovers from compression—such as the compression occurring upon impact when a level falls and lands on its end. Both intermediate layer 22 and outer and inner layers 21, 23 are composed from materials having sufficient resilience such that the level can withstand many repeated droppings and other such abuse without any recognizable permanent deformation in end caps 20.

When level 10 is dropped or outer surface 18 of either end cap 20 otherwise strikes a surface, end cap 20 is compressed such that the distance between at least some part of outer layer 21 and end 14, 15 is reduced. In this manner, end cap 20 absorbs impact to outer layer 21 and thereby prevents damage to body 11.

One skilled in the art will recognize that certain materials having resilient compressibility will have lower density than materials having lesser resilient compressibility. More often materials having greater resilient compressibility have a lower measure of hardness as on the Shore A scale than less compressible materials. "Hardness" relates to compressibility of the material; the harder a material, the less compressible it is, and vice versa. Hardness also relates to resistance to deformation under pressure, and this correlates to an ability to avoid cutting when the material impacts sharp objects. Hardness also relates to abrasion resistance, a desirable characteristic during typical rough use of a level. It is desirable therefore that the materials selected for layers 21, 22, 23 fall within specific hardness ranges for optimal performance. In particular, the material chosen for outer and inner layers 21, 23 is preferably one that also has high abrasion resistance.

In certain embodiments, outer and inner layers 21,23 are composed of acrylonitrile butadiene styrene and intermediate layer 22 is a thermoplastic rubber. Outer layer 21 and inner layer 23 are preferably made from an identical elastomer while intermediate layer comprises a different elastomer having greater resilient compressibility. An "elastomer" is a polymeric compound with elastic properties. While many materials may be suitable for outer layer 21, elastomers particularly preferred are polyolefins, polyurethanes and polyesters that are chosen to have good hardness and impact resistance. Likewise, while many materials may be suitable for intermediate layer 22, particularly desirable elastomers are polyurethanes and polyesters chosen to have a resilient compressibility greater than that of the material selected for outer layer 21. Persons of ordinary skill in the art will be aware of numerous other materials satisfying the requirements for the two-material end caps 20 of this invention.

In FIGS. 1 and 2, outer layers 21, intermediate layers 22, and inner layers 23 are shown to extend from a lower surface 24 to an upper surface 25. Lower surface 24 is aligned in the same plane as bottom surface 34 of level 10. Lower surface 24 includes bottom edge 35 of outer layer 21. Upper surface 25 is likewise co-planar with top surface 36 of level 10. Upper surface 25 has top edge 31 of outer layer 21 therein. End caps 20 are thereby coextensive with body 11 such that either end cap 20 does not interfere with level 10 during measurements of surface 13.

In FIG. 2, each end cap 20 further includes an interior portion 26 comprising a web layer connecting outer layer 21 with inner layer 23. Interior portion 26 is preferably composed of the same material as outer layer 21 and inner layer 23.

Figure 4:
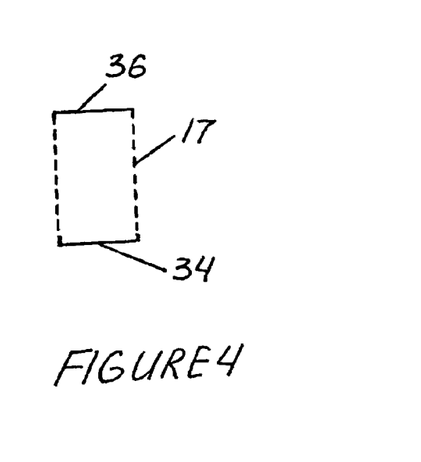
FIG. 4 is an end view of an end of the body of the level in FIG. 1.
Figure 5:
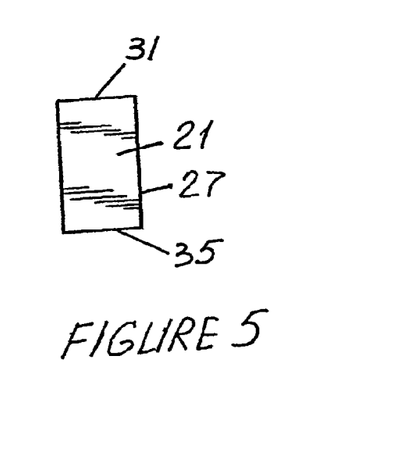
FIG. 5 is an end view of the outer surface of an outer portion of the end cap in FIG. 1.
Figure 6A:
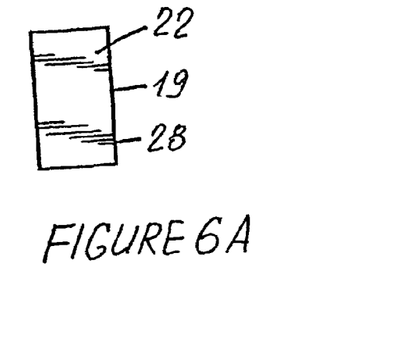
FIGS. 6A–B are cross-sectional views of segments of an intermediate portion of the end cap in FIG. 1.
Figure 6B:
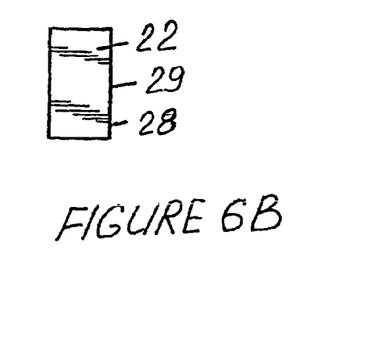

FIGS. 4, 5, and 6 show the profiles of various level components. FIG. 4 is a cross-sectional view of body 11 near ends 14,15 showing body profile 17 as having a rectangular shape. FIG. 5 is a cross-sectional view of outer layer 21 illustrating outer profile 27 as matching body profile 17, i.e., outer profile 27 has the same rectangular shape as body profile 17. Inner layer 23 also has a profile that is preferably congruent with body profile 17.

FIGS. 6A, 6B show two cross-sectional views of ridged intermediate layer 22 having intermediate profile 28. First segment 19 of intermediate profile 28 is shown in FIG. 6A with a profile matching body profile 17 and outer profile 27. Second segment 29 of intermediate profile 28, as illustrated in FIG. 6B, has a smaller rectangular shape than body profile 17 and outer profile 27. Such a configuration aids compression of intermediate layer 22 during impact. In addition, as stated above, with outer, intermediate, and inner layers 21,22,23 having no profiles greater than body profile 17, end caps 20 offer no interference with measurements performed by level 10.

Figure 7:
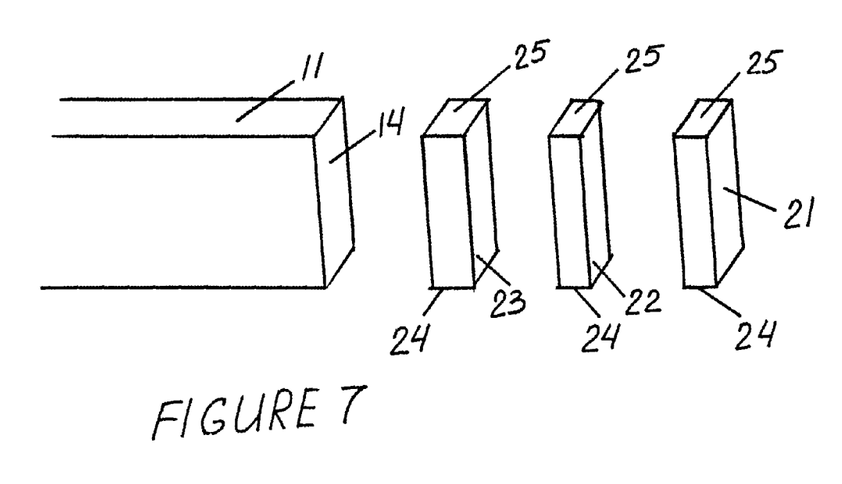
FIG. 7 is an exploded view of one embodiment of the end cap shown in FIG. 1.

FIG. 7 is an exploded view of one embodiment of the end cap 20 shown in FIG. 1. In this embodiment, inner layer 23 preferably has a depth, i.e., thickness, greater than either intermediate layer 22 or outer layer 21 and outer layer 21 has a depth less than intermediate layer 22.

Figure 8:
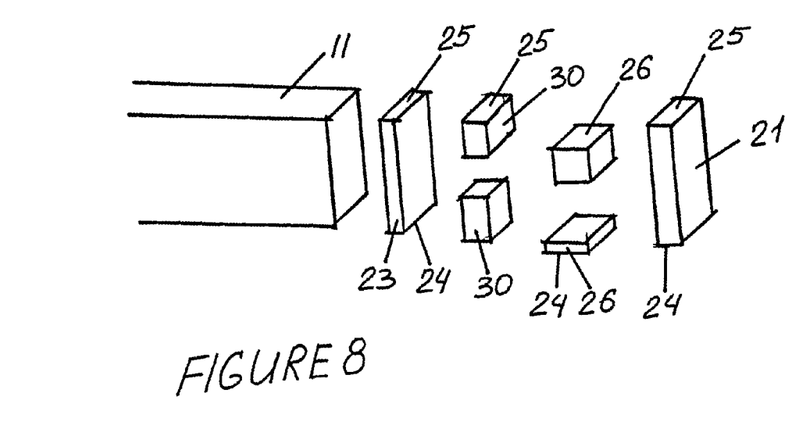
FIG. 8 is an exploded view of an end cap shown in FIG. 2.

FIG. 8 is an exploded view of the end cap 20 shown in FIG. 2. In this embodiment, end cap 20 includes an interior portion 26 comprising a web layer intersecting intermediate layer 22 and connecting outer layer 21 with inner layer 23. Interior portion 26 can be comprised of two separate parts as illustrated. Interior portion 26 is joined to intermediate portions 30 to form intermediate layer 22. Intermediate portions 30 are formed from a material having greater resilient compressibility than the material forming outer and inner layers 21, 23. Interior portion 26 is preferably composed of the same material as layers 21, 23.

Interior portion 26 may be integrally formed from one material with either or both of outer layer 21 and inner layer 23. Interior portion 26 may also be a separate piece securely bonded to layers 21, 23 as well as to intermediate portions 30 using any of the methods described earlier.

Figure 9:
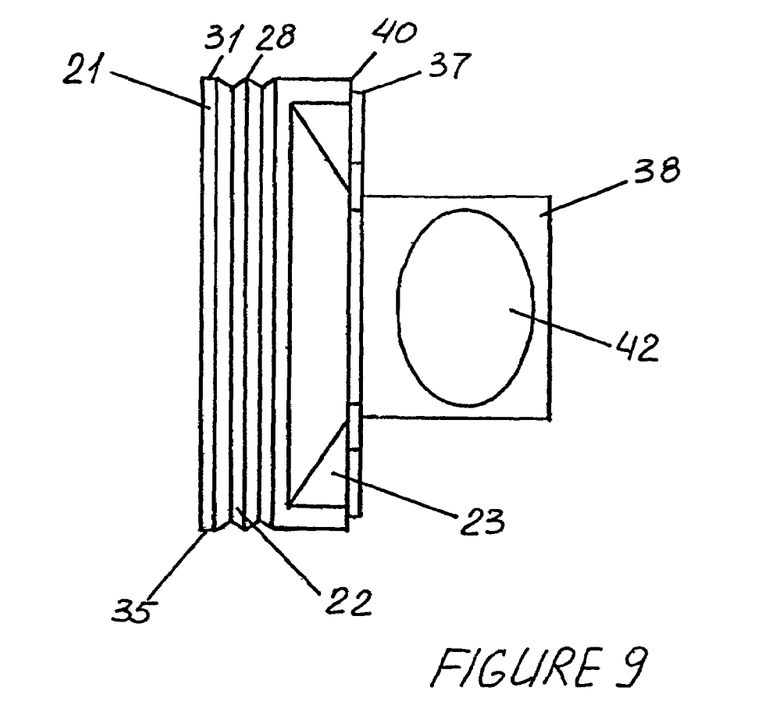
FIG. 9 is a side view of another embodiment of the end cap shown in FIG. 1.

FIG. 9 is a side view of another embodiment of the end caps 20 in FIG. 1. Outer layer 21 is seen abutting intermediate layer 22 and having substantially horizontal top and bottom edges 31, 35. Intermediate layer 22 presents a serrated profile 28 that circumscribes end cap 20. Inner layer 23 includes interior flange 37 and attachment ring 38 on the side opposite from intermediate layer 22.

Interior flange 37 is spaced below exterior edge 40 of inner layer 23 to allow inner layer 23 to be snugly received within either end 14, 15. Attachment ring 38 is sized so that, after end cap 20 is inserted within body 11 through either end 14, 15, aperture 42 of ring 38 is in registry with openings 44 on either side of body 11. An insert 46 is placed through each opening 44 so that both inserts 46 meet within aperture 42. (Only one opening 44 and one insert 46 is illustrated in FIG. 1, the other opening and insert on the opposite side of level 10 being identical to the ones shown.) Ultrasonic welding is preferably used to bond together the contacting surfaces of inserts 46 to secure end cap 20 to either end 14, 15.

Figure 10:
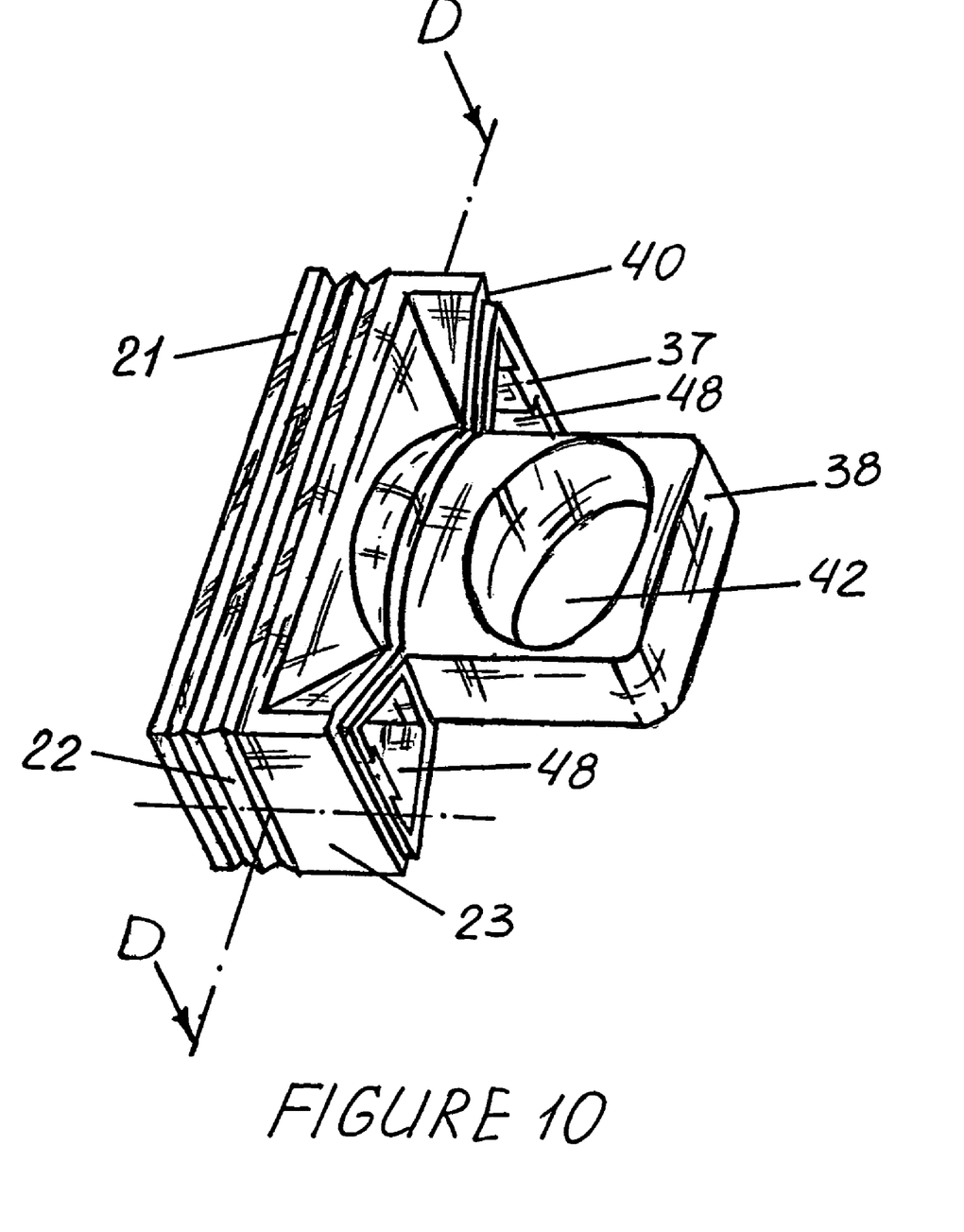
FIG. 10 is a perspective view of the end cap in FIG. 9.

FIG. 10 is a perspective of the embodiment of end cap in FIG. 9. Two cavities 48 are shown above and below ring 38. Each cavity 48, as seen in FIG. 11, extends from interior flange 37 of inner layer 23 through intermediate layer 22 to the back surface 50 of outer layer 21.

Figure 11:
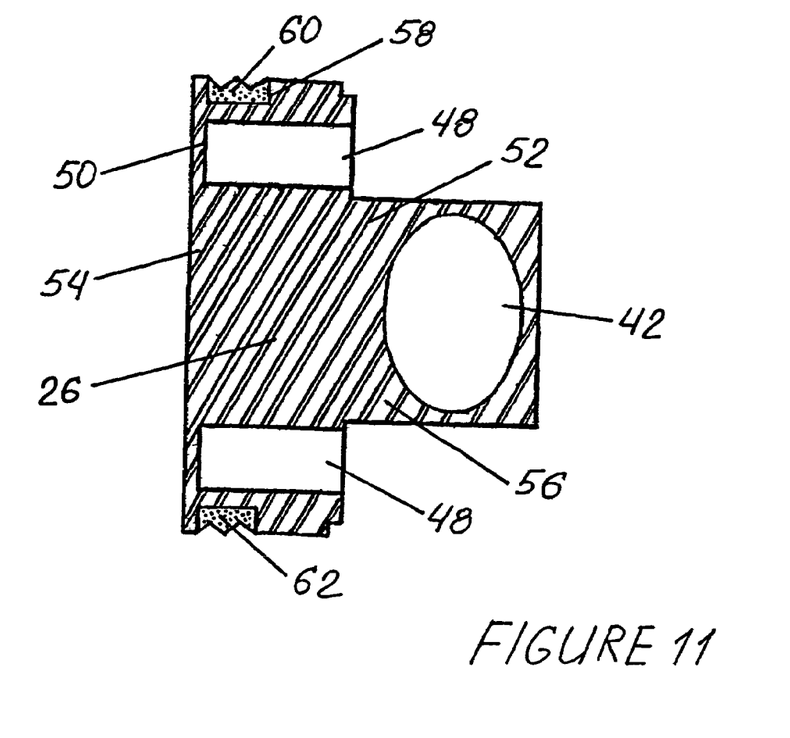
FIG. 11 is a side sectional view of the end cap along section line D—D in FIG. 10.

FIG. 11 is a cross-sectional view of end cap 20 illustrating that end cap 20 is comprised of an end-cap-member 52. End-cap-member 52 is an integral, unitary piece preferably formed through a molding process. End-cap-member 52 has an outer portion 54 comprising outer layer 21, an interior portion 26, and an inner portion 56 comprising inner layer 23. Interior portion 26 defines a groove 58 that extends completely around interior portion 26 between inner and outer portions 56, 54. Exterior portion 60 is fastened to interior portion 26 to form intermediate layer 22 and is preferably a band 62 sized to fit within groove 58. Cavities 48 provide added compressibility to intermediate layer 22.

Exterior portion 60 is comprised of a material having greater resilient compressibility than the material forming end-cap-member 52. Exterior portion 60 is preferably joined to interior portion 26 through an overmolding process that embeds band 62 within groove 58. In such cases, end-cap-member 52 is preferably made from a material having a higher melting point than the material forming band 62.

Thus, it should be apparent that there has been provided, in accordance with the present invention, an impact-absorbing end cap for use with levels that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. An end cap for a level having a body extending longitudinally from a first end to a second end, the end cap being secured with respect to the first end and comprising an outer portion and an intermediate portion positioned between the outer portion and the body such that the entire outer portion is spaced apart and outward from the first end, the outer portion having a bottom edge co-planar with a bottom surface of the body and the intermediate portion being securely fastened with respect to the outer portion and having greater resilient compressibility than the outer portion, such that the end cap is adapted to absorb impacts to the outer portion to prevent damage to the level.

2. The end cap of claim 1 wherein the outer portion extends from a top edge to the bottom edge, the top edge being co-planar with a top surface of the body.

3. The end cap of claim 2 wherein the body has an outside contour at the first end defining a body profile, the outer portion has an outside contour substantially congruent with the body profile, and the intermediate portion has first segments with outside contours substantially congruent with the body profile spaced apart by second segments with outside contours smaller and geometrically similar to the body profile.

4. The end cap of claim 1 further comprising an inner portion having lesser resilient compressibility than the intermediate portions, the intermediate portion being securely fastened with respect to the inner portion and being spaced apart and outward from the first end by the inner portion.

5. The end cap of claim 4 wherein the outer portion is spaced apart from the inner portion and the inner portion alone abuts the first end to secure the end cap to the body.

6. The end cap of claim 5 wherein the inner and outer portions are composed of the same material.

7. The end cap of claim 6 wherein the inner and outer portions have Shore A hardness of at least about 75 (on the Shore A scale of 0–100).

8. The end cap of claim 7 wherein the inner and outer portions have Shore A hardness of at least about 85.

9. The end cap of claim 8 wherein the inner and outer portions have Shore A hardness of about 90.

10. The end cap of claim 6 wherein the intermediate portion has a Shore hardness of no more than about 70.

11. The end cap of claim 10 wherein the intermediate portion has a Shore hardness of no more than about 60.

12. The end cap of claim 11 wherein the intermediate portion has a Shore hardness of about 55.

13. The end cap of claim 6 wherein all portions are elastomeric.

14. The end cap of claim 6 further comprising at least one interior portion positioned between and securely fastened to the inner and outer portions and wherein the intermediate portion is securely fastened to the interior portion to form an intermediate layer extending between the inner and outer portions.

15. The end cap of claim 14 wherein the inner, interior and outer portions form an integral end-cap-member defining a groove and wherein the intermediate portion is a band embedded within the groove.

16. The end cap of claim 15 wherein the groove circumscribes the interior portion.

17. The end cap of claim 15 wherein the interior portion has at least one cavity.

18. The end cap of claim 17 wherein the cavity extends through the inner portion to the first end.

19. The end cap of claim 18 wherein the interior portion has two cavities, each cavity extending through the inner portion to the first end.

20. The end cap of claim 15 wherein the inner portion includes an attachment ring adapted to be received within the body through the first end and having an aperture therein and wherein the body has openings spaced adjacent to the first end and in registry with the aperture such that at least one insert is received by the openings and aperture to firmly secure the end cap to the first end.

21. The end cap of claim 1 wherein the level has at least one vial is mounted to the body.

22. In a level including (a) a body extending longitudinally from a first end to a second end, (b) a level face connected with respect to the body, the level face for measuring a surface, and (c) a vial mounted with respect to the body at a predetermined angular relationship to the level face, the improvement wherein end caps are mounted to the first and second ends, each end cap has an outer layer spaced apart and outward from the corresponding end, an intermediate layer positioned between the entire outer layer and the corresponding end and a bottom outer-edge co-planar with the level face, the intermediate layer being composed of a material joined to the outer layer and having greater compressibility than the outer portion, whereby impact to either end cap results in greater compression of the end cap and dissipation of the impact to prevent damage to the level.

23. The level of claim 22 wherein the level face is a bottom surface of the body and the body defines a body profile at each end, the outer layers define outer profiles matching the body profile and each outer layer has a top outer-edge co-planar with a top surface of the body, and the intermediate layers define serrated intermediate profiles, each intermediate layer having first and second segments, the first segments defining first profiles matching the body profile and having top and bottom intermediate-edges co-planar with the top and bottom outer-edges respectively and the second segments defining second profiles smaller than the body profile.

24. The level of claim 23 wherein each end cap further includes an inner layer abutting the corresponding end, the intermediate layer of each end cap is joined to the inner layer, has greater compressibility than the inner layer and is spaced apart from the corresponding end by the inner layer, and the outer layer of each end cap is spaced apart from the inner layer by the intermediate layer.

25. The level of claim 24 wherein the intermediate layer of each end cap includes interior and exterior portions, the interior portion connecting the inner layer to the outer layer and forming an integral end-cap-member composed of a material different from the material composing the exterior portion.

26. The level of claim 25 wherein the end-cap-member defines a groove and the exterior portion is a band embedded within the groove.

27. The level of claim 26 wherein the exterior portion and the end-cap-member are composed of different elastomers.

28. The level of claim 27 wherein each interior portion includes two cavities extending through the inner layer to the corresponding end.

\* \* \* \* \*